US010869273B2

(12) United States Patent
Kim et al.

(10) Patent No.: US 10,869,273 B2
(45) Date of Patent: Dec. 15, 2020

(54) METHOD FOR TRANSMITTING AND RECEIVING WAKE-UP PACKET IN WIRELESS LAN SYSTEM, AND APPARATUS THEREFOR

(71) Applicant: LG ELECTRONICS INC., Seoul (KR)

(72) Inventors: Jeongki Kim, Seoul (KR); Kiseon Ryu, Seoul (KR); Suhwook Kim, Seoul (KR); Hyunhee Park, Seoul (KR); Hangyu Cho, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/341,863

(22) PCT Filed: Oct. 13, 2017

(86) PCT No.: PCT/KR2017/011297
§ 371 (c)(1),
(2) Date: Apr. 12, 2019

(87) PCT Pub. No.: WO2018/070820
PCT Pub. Date: Apr. 19, 2018

(65) Prior Publication Data
US 2019/0246356 A1 Aug. 8, 2019

Related U.S. Application Data

(60) Provisional application No. 62/522,741, filed on Jun. 21, 2017, provisional application No. 62/520,572, (Continued)

(51) Int. Cl.
*H04L 27/02* (2006.01)
*H04W 80/02* (2009.01)
(Continued)

(52) U.S. Cl.
CPC ........ *H04W 52/0235* (2013.01); *H04L 27/02* (2013.01); *H04W 52/02* (2013.01);
(Continued)

(58) Field of Classification Search
CPC .......... H04W 52/0229; H04W 40/244; H04W 72/0446; H04W 4/008; H04W 84/12
See application file for complete search history.

(56) References Cited

U.S. PATENT DOCUMENTS

2003/0119568 A1  6/2003 Menard
2017/0332327 A1* 11/2017 Fang ..................... H04L 5/0007
(Continued)

FOREIGN PATENT DOCUMENTS

JP       2013085087        5/2013
KR    1020140033222       3/2014
(Continued)

OTHER PUBLICATIONS

PCT International Application No. PCT/KR2017/011297, International Search Report dated Jan. 24, 2018, 6 pages.

*Primary Examiner* — Iqbal Zaidi
(74) *Attorney, Agent, or Firm* — Lee, Hong, Degerman, Kang & Waimey PC

(57) ABSTRACT

A method for a station (STA) receiving a wake-up radio (WUR) packet in a wireless LAN (WLAN) system according to an embodiment of the present invention comprises the steps of: entering a WUR mode; receiving a WUR packet in the WUR mode using a WUR receiver of the STA; and determining whether to terminate the WUR mode depending on whether a receiver's address included in the WUR packet corresponds to a WUR ID of the STA, wherein the WUR ID of the STA may be one that is allocated by an access point (AP) via a primary connectivity radio before the STA enters the WUR mode.

6 Claims, 31 Drawing Sheets

Related U.S. Application Data filed on Jun. 16, 2017, provisional application No. 62/519,846, filed on Jun. 14, 2017, provisional application No. 62/408,077, filed on Oct. 14, 2016.

(51) Int. Cl.
  *H04W 52/02* (2009.01)
  *H04W 84/12* (2009.01)
  *H04W 76/11* (2018.01)

(52) U.S. Cl.
  CPC ............ *H04W 76/11* (2018.02); *H04W 80/02* (2013.01); *H04W 84/12* (2013.01); *Y02D 30/70* (2020.08)

(56) References Cited

U.S. PATENT DOCUMENTS

2018/0069683 A1* 3/2018 Huang .................. H04L 5/0092
2019/0357143 A1* 11/2019 Wang ................ H04W 52/0229

FOREIGN PATENT DOCUMENTS

| KR | 1020150074148 | 7/2015 |
|---|---|---|
| KR | 1020160032659 | 3/2016 |

* cited by examiner (a)

| Frame Type = 0 | Flag = 0 | Transmitter ID | AID | FCS |

| Frame Type = 0 | Flag = 1 | Transmitter ID | WID | FCS |

FIG. 25

| Frame Type = 0 | Transmitter ID | AID | FCS |

| Frame Type = 1 | Transmitter ID | WID | FCS |

FIG. 26

| Frame Type = 0 | Flag = 0 | Transmitter ID | AID | FCS |

| Frame Type = 0 | Flag = 1 | Transmitter ID | PAID | FCS |

FIG. 27

| Frame Type = 0 | Transmitter ID | AID | FCS |

| Frame Type = 1 | Transmitter ID | PAID | FCS |

FIG. 28

| Frame Type = 0 | Transmitter ID | 11 bits PAID (or AID) | FCS |
|---|---|---|---|

| Frame Type = 1 | Transmitter ID | 8 bits PAID | FCS |
|---|---|---|---|

| Frame Type = 2 | Transmitter ID | 6 bits PAID | FCS |
|---|---|---|---|

| Frame Type = 3 | Transmitter ID | 4bits PAID | FCS |
|---|---|---|---|

METHOD FOR TRANSMITTING AND RECEIVING WAKE-UP PACKET IN WIRELESS LAN SYSTEM, AND APPARATUS THEREFOR

CROSS-REFERENCE TO RELATED APPLICATIONS

This application is the National Stage filing under 35 U.S.C. 371 of International Application No. PCT/KR2017/011297, filed on Oct. 13, 2017, which claims the benefit of U.S. Provisional Application No. 62/408,077, filed on Oct. 14, 2016, 62/519,846, filed on Jun. 14, 2017, 62/520,572, filed on Jun. 16, 2017, and 62/522,741, filed on Jun. 21, 2017, the contents of which are all hereby incorporated by reference herein in their entireties.

BACKGROUND OF THE INVENTION

Field of the Invention

The present invention relates to a method for transmitting and receiving a wake-up radio (WUR) packet through a low power wake-up radio receiver (LP-WURx) which is compatible with 802.11 wireless LAN system and an apparatus for the same.

Related Art

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

SUMMARY OF THE INVENTION

The present invention provides a method for transmitting and receiving a WUR packet through a low power wake-up radio receiver (LP-WURx) which is compatible with 802.11 wireless LAN system efficiently and accurately, and an apparatus for the same.

The present invention is not limited to the technical problem to solve described above, but the other technical problem to solve may be inferred from the embodiments of the present invention.

In an aspect of the present invention to solve the technical problem, a method for receiving a wake-up radio (WUR) packet in a wireless LAN (WLAN) system performed by a station (STA) may include entering a WUR mode; receiving a WUR packet through a WUR receiver of the STA in the WUR mode; and determining whether to terminate the WUR mode depending on whether a receiver address included in the WUR packet corresponds to a WUR ID of the STA, wherein the WUR ID of the STA may be allocated from an access point (AP) through a primary connectivity radio before the STA is switched to the WUR mode.

In aspect of the present invention to solve the technical problem, a station (STA) for receiving a wake-up radio (WUR) packet in a wireless LAN (WLAN) system may include a WUR receiver for receiving a WUR packet in a WUR mode; and a processor for controlling the WUR receiver so as to enter the WUR mode, wherein whether to terminate the WUR mode is determined depending on whether a receiver address included in the WUR packet may correspond to a WUR ID of the STA, and wherein the WUR ID of the STA may be allocated from an access point (AP) through a primary connectivity radio before the STA is switched to the WUR mode.

In another aspect of the present invention to solve the technical problem, a method for transmitting a wake-up radio (WUR) packet in a wireless LAN (WLAN) system may include generating a WUR packet for waking up a station (STA) operating in a WUR mode; and transmitting the WUR packet to the STA, wherein a receiver address included in the WUR packet may correspond to a WUR ID of the STA, and wherein the AP may allocate the WUR ID to the STA through a primary connectivity radio before the STA enters the WUR mode.

In another aspect of the present invention to solve the technical problem, an access point (AP) for transmitting a wake-up radio (WUR) packet in a wireless LAN (WLAN) system may include a processor for waking up a station (STA) operating in a WUR mode; and a transmitter for transmitting the WUR packet according to a control of the processor, wherein a receiver address included in the WUR packet may correspond to a WUR ID of the STA, and wherein the processor may allocate the WUR ID to the STA through a primary connectivity radio before the STA enters the WUR mode.

The WUR ID of the STA may be allocated through an association response from the AP, a parameter negotiation procedure with the AP for the WUR mode or a response frame of the AP for a WUR mode change request of the STA.

The STA may terminate the WUR mode when the receiver address included in the WUR packet corresponds to a part designated in the WUR ID of the STA.

A length of the receiver address of the WUR packet may be varied according to a determination of the AP, and wherein information indicating the length of the receiver address which is varied may be received through the WUR packet or a WUR Beacon which is periodically broadcasted.

The information indicating the length of the receiver address which is varied may be received through a frame type field included in a MAC header of the WUR packet.

The receiver address of the WUR packet may be configured with at least one format of an association ID (AID) of the STA, a partial AID (PAID) corresponding to least significant bit (LSB) n-bit or a wake-up radio identifier allocated separately from the AID.

The WUR packet may further include information indicating a format of the receiver address.

According to an embodiment of the present invention, an LP-WURx is provided which is compatible with a wireless LAN system, and power consumption of an STA is reduced, and further, a WUR packet may be transmitted and received efficiently and accurately through a WUR ID which is allocated through a primary connectivity radio before entering a WUR mode.

The other technical effects in addition to the other technical effects described above may be inferred from the embodiments of the present invention.

BRIEF DESCRIPTION OF THE DRAWINGS

FIG. 24 illustrates an example of indicating a type of RX ID included in a WUR packet according to an embodiment of the present invention.

FIG. 25 illustrates an example of indicating a type of RX ID included in a WUR packet according to another embodiment of the present invention.

FIG. 26 illustrates an example of indicating a type of RX ID included in a WUR packet according to still another embodiment of the present invention.

FIG. 27 illustrates an example of indicating a type of RX ID included in a WUR packet according to still another embodiment of the present invention.

FIG. 28 illustrates an example of indicating a length of a PAID included in a WUR packet according to an embodiment of the present invention.

DESCRIPTION OF EXEMPLARY EMBODIMENTS

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a wireless LAN system to which the present invention is applied will first be described in detail.

Figure 1:
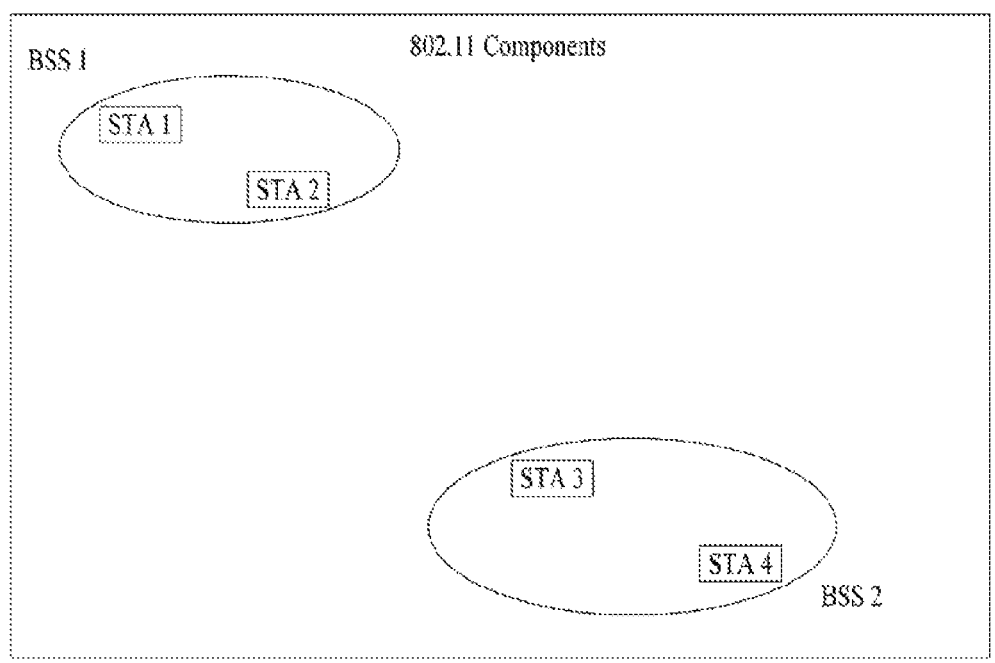
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
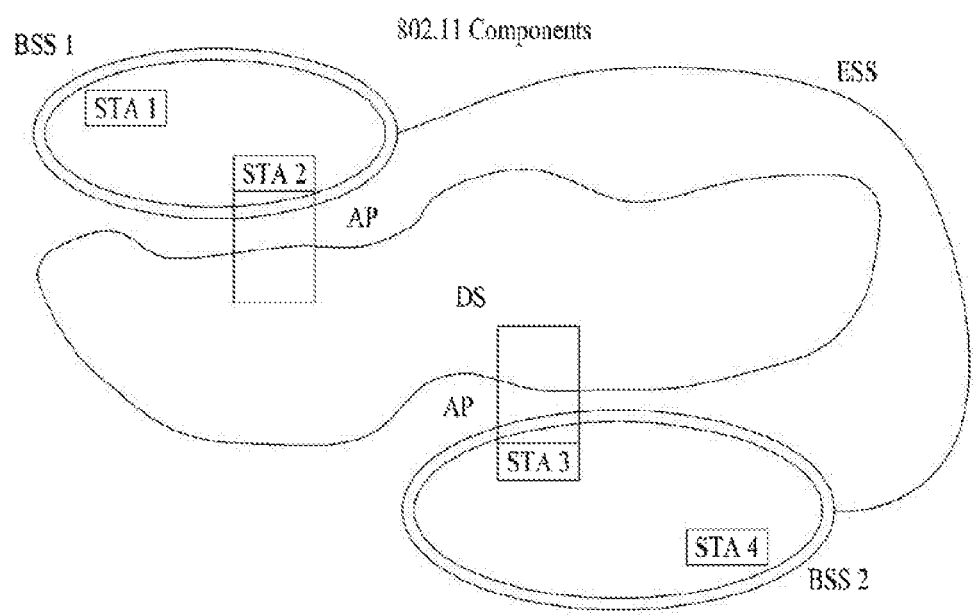
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of a STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
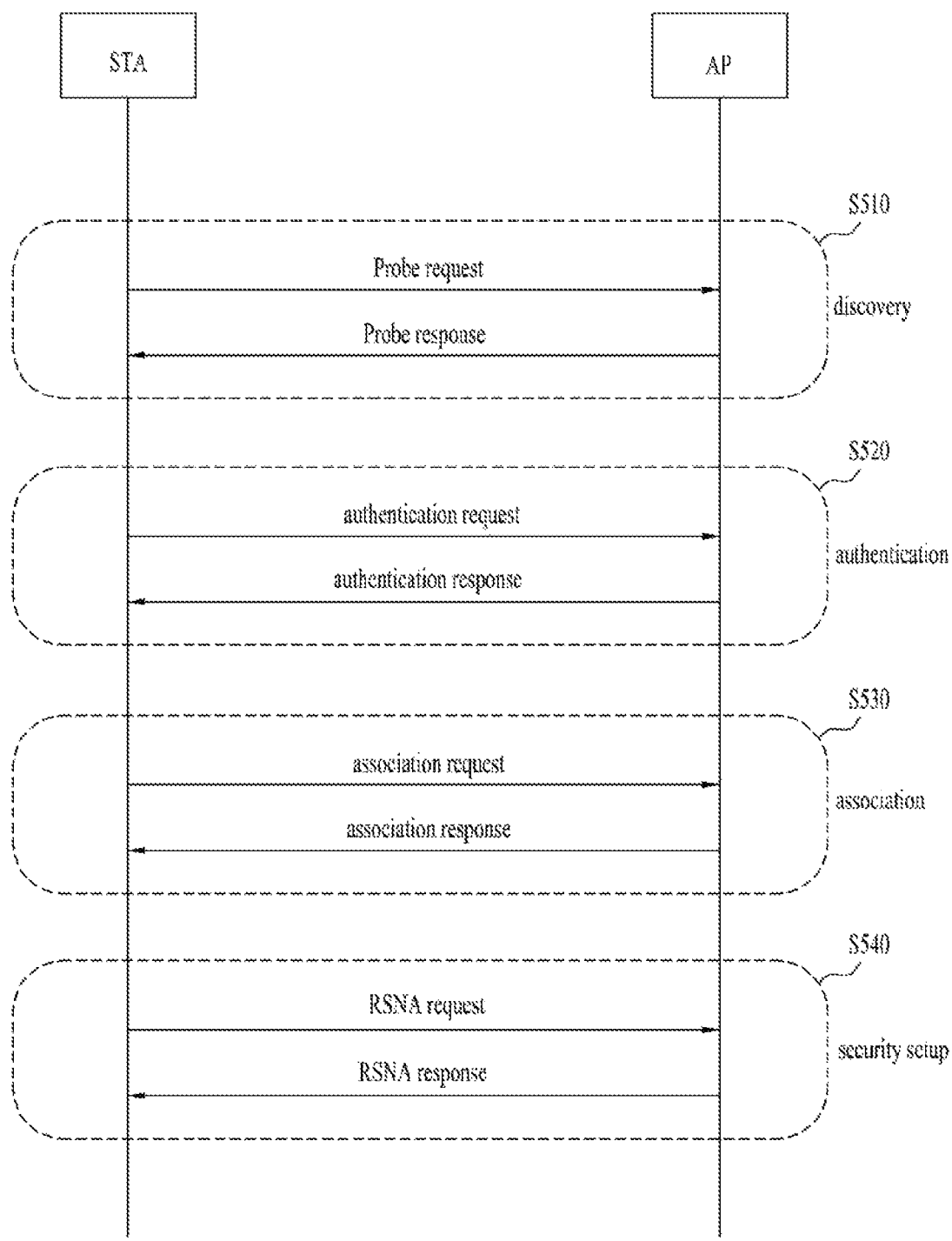
FIG. 3 is a diagram for describing a general link setup process.

FIG. 3 is a diagram for explaining a general link setup process.

In order to allow an STA to establish link setup on the network as well as to transmit/receive data over the network, the STA needs to perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

An exemplary Link setup process is described referring to FIG. 3.

In step S510, an STA may perform the network discovery action. The network discovery action may include the STA scanning action. That is, the STA needs to search for an available network so as to access the network. The STA needs to identify a compatible network before participating in a wireless network. Here, the process for identifying the network contained in a specific region is referred to as a scanning process.

The scanning scheme is classified into an active scanning and a passive scanning.

FIG. 3 illustrates a network discovery action including an active scanning process. In the case of the active scanning, an STA configured to perform scanning transmits a probe request frame and waits for a response to the probe request frame, such that the STA may move between channels and at the same time can determine which Access Point (AP) is present in a peripheral region. A responder transmits a probe response frame, acting as a response to the probe request frame, to the STA having transmitted the probe request frame. In this case, the responder may be a STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning scheme. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA may participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process may be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA based on information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11-based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "listen before talk" access mechanism. According to the above-mentioned access mechanism, the AP and/or STA may perform Clear Channel Assessment (CCA) for sensing an RF channel or medium during a predetermined time interval (for example, DCF Inter-Frame Space (DIFS)), prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
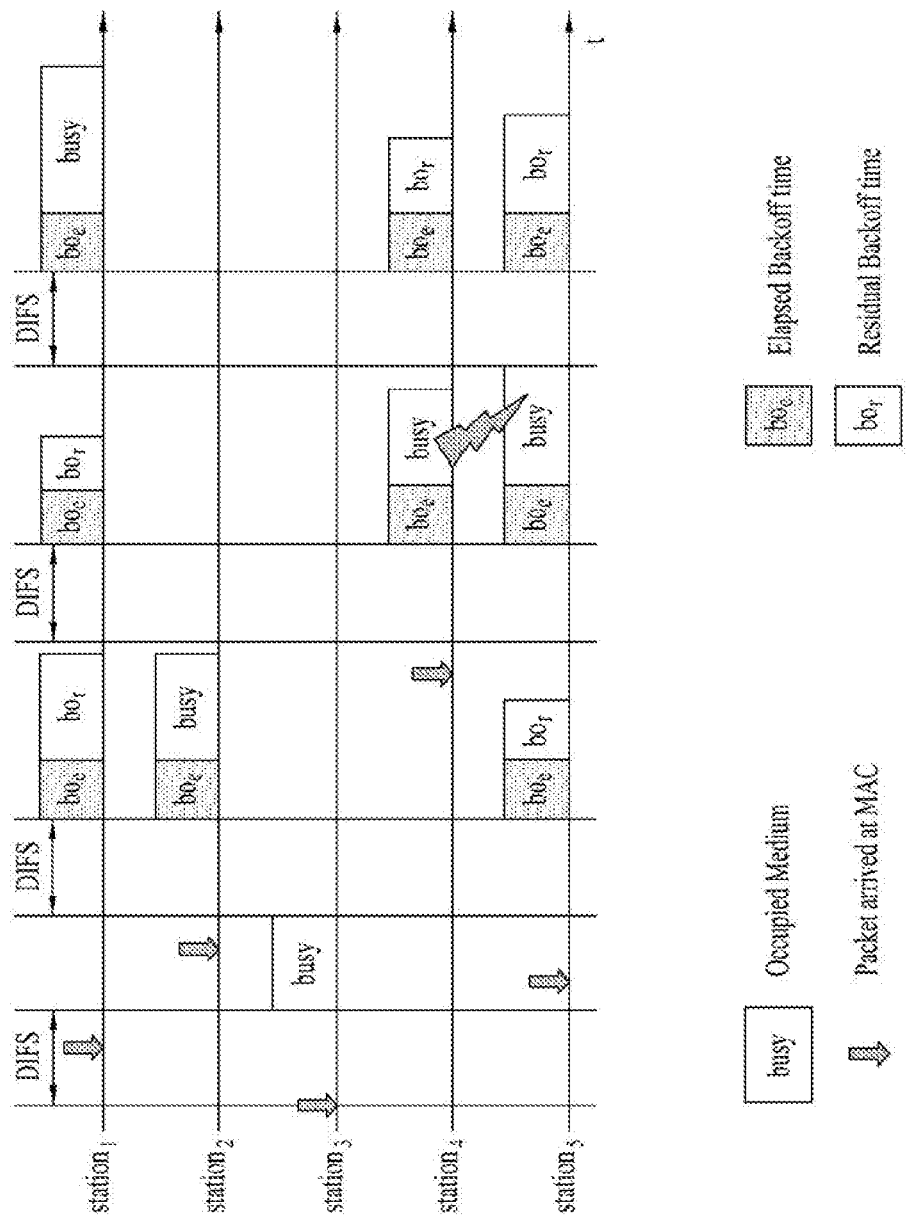
FIG. 4 is a diagram for describing a backoff procedure.

FIG. 4 is a diagram for describing a backoff procedure.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 5:
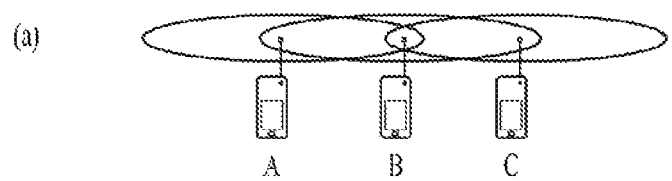
FIG. 5 is a diagram for describing a hidden node and an exposed node.
Figure 5:
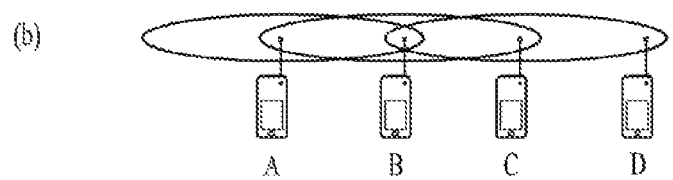

FIG. 5 is a diagram for describing a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
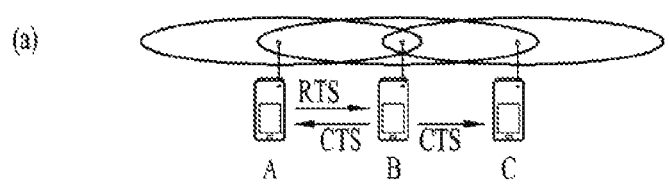
FIG. 6 is a diagram for describing RTS and CTS.
Figure 6:
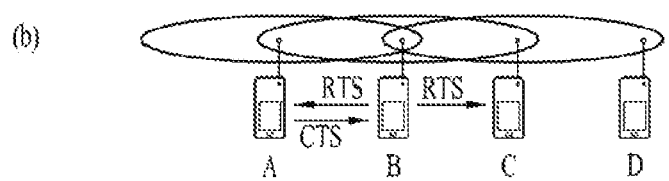

FIG. 6 is a diagram for describing RTS and CTS.

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STAB, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unicast frame and a delivery traffic indication map (DTIM) used to indicate a multicast or broadcast frame.

Figure 7:
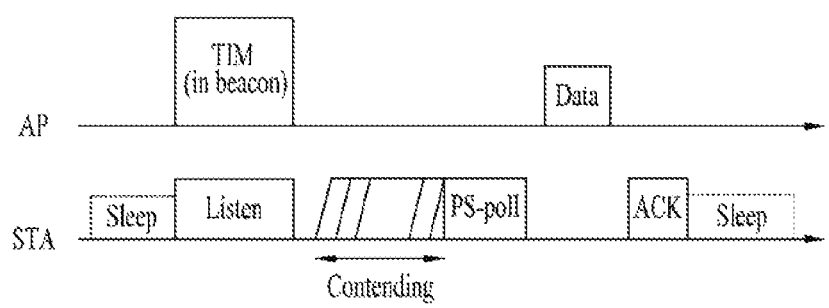
FIGS. 7 to 9 are diagrams for describing an operation of an STA that has received TIM.
Figure 8:
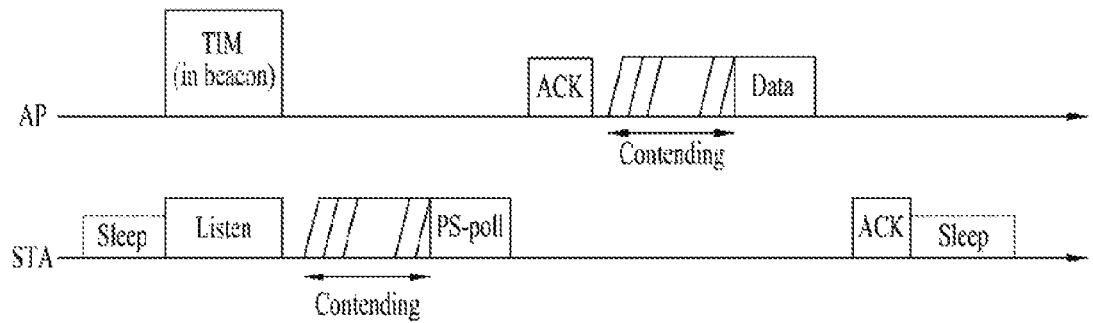
Figure 9:
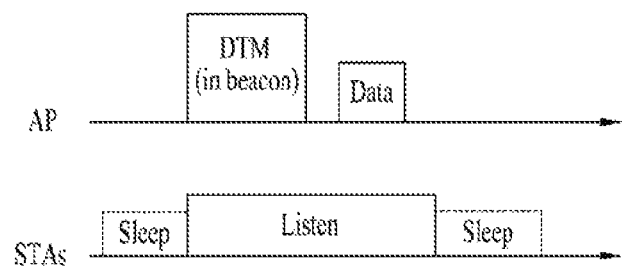

FIGS. 7 to 9 are diagrams for describing an operation of an STA that has received TIM.

Referring to FIG. 7, an STA is switched from the sleep state to the awake state so as to receive the beacon frame including a TIM from the AP. The STA interprets the received TIM element such that it can recognize the presence or absence of buffered traffic to be transmitted to the STA. After the STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. The STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time (for example, Short Inter-Frame Space (SIFS)). In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. The STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While the STAs continuously maintains the awake state after reception of the beacon frame including the DTIM, the STAs may receive data, and then switch to the sleep state after completion of data reception.

General Frame Structure

Figure 10:
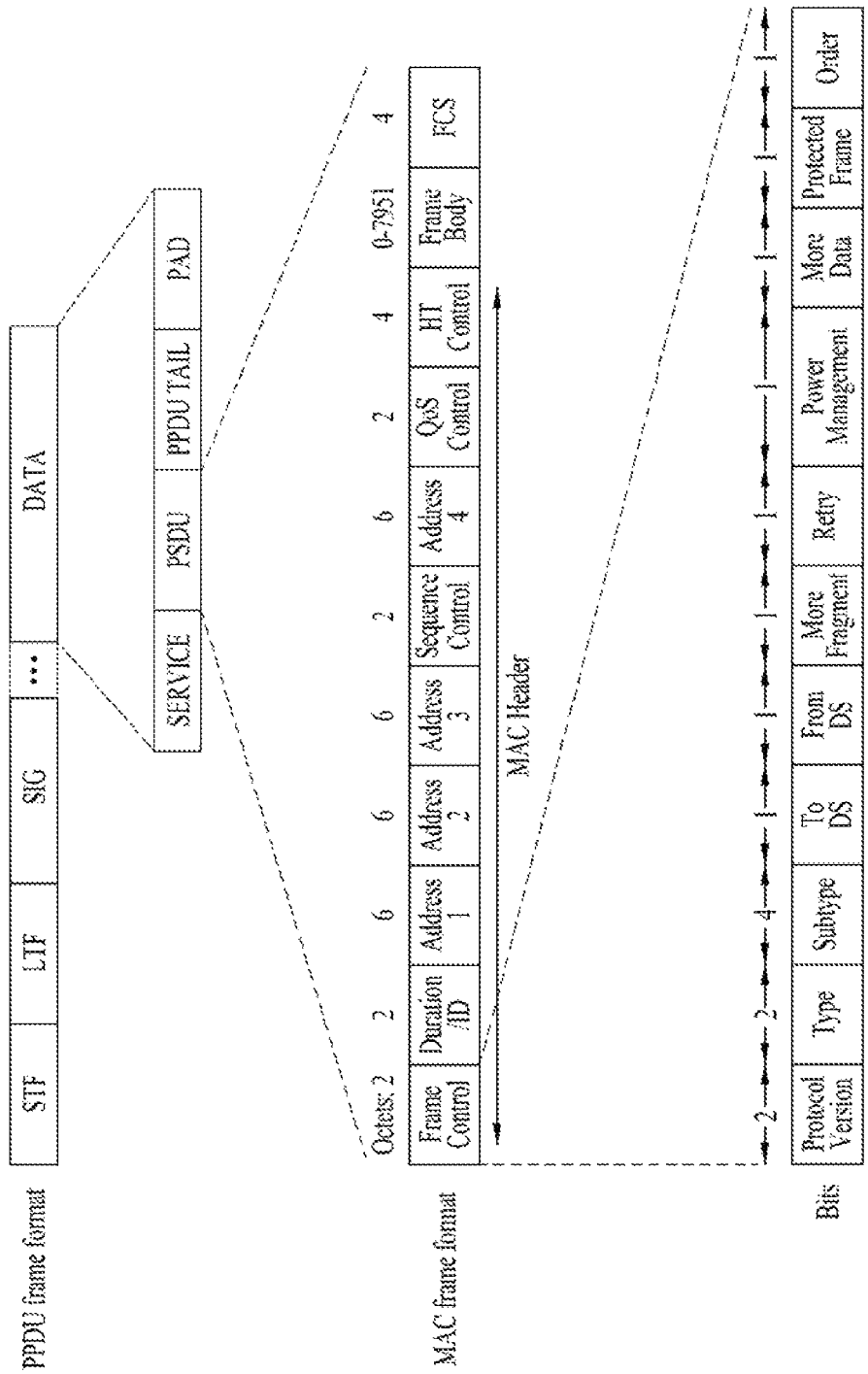
FIG. 10 is a diagram for describing an example of a frame structure used in an IEEE 802.11 system.

FIG. 10 is a diagram for describing an example of a frame structure used in an IEEE 802.11 system.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and subtype, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (µs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Low-Power Wake-Up Receiver, LP-WURx

Figure 11:
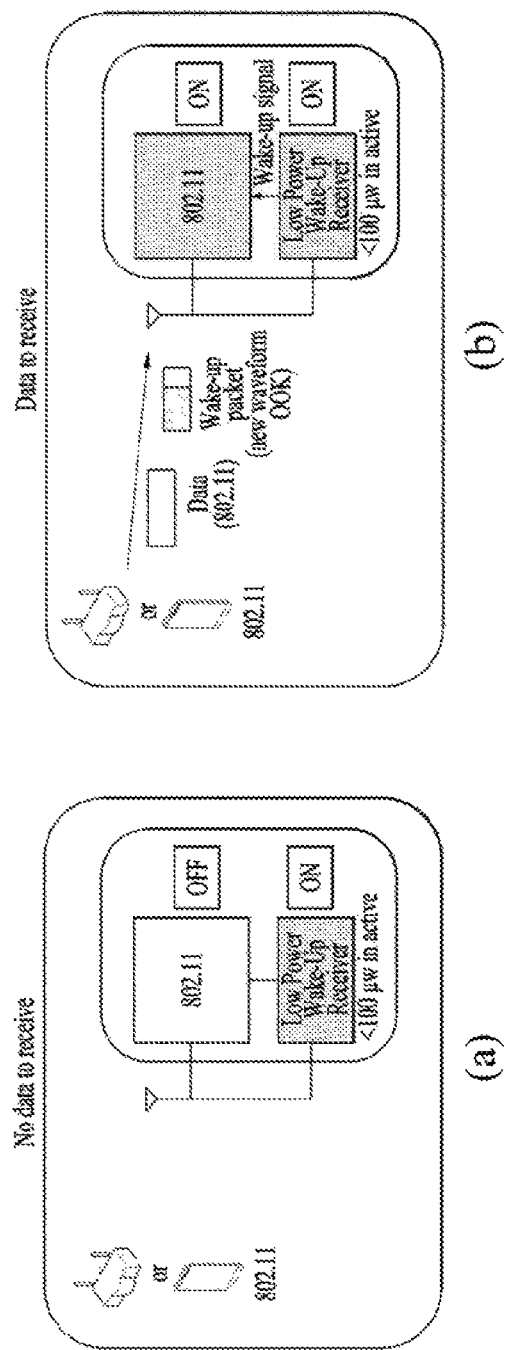
FIG. 11 describes an LP-WUR which is usable in a wireless LAN system (e.g., 802.11).

Referring to FIG. 11, a general content for an LP-WURx which is usable in a wireless LAN system (e.g., 802.11) is described.

Referring to FIG. 11, a receiver may be configured by combining a Primary connectivity radio (PCR) (e.g., IEEE 802.11a/b/g/n/ac/ax wireless LAN) of a main wireless communication use and an LP-WURx.

The Primary connectivity radio (PCR) is used for data transmission and reception, and may be powered-off when there is no data to transmit and receive. As such, as a case that the PCR is powered off, when there is a packet to receive, the LP-WURx may wake up the PCR. Accordingly, user data is transmitted and received through the Primary connectivity radio.

The LP-WURx may not be used for the user data, but perform the role of waking up the Primary connectivity radio only. The LP-WURx may have a simple receiver shape not having a transmitter, and activated while the Primary connectivity radio is powered off. It is preferable that the target power consumption of the LP-WURx does not exceed 100 microW (µW) in the activated state. As such, a simple modulation scheme for operating in low power, for example, on-off keying (OOK) scheme may be used, and a narrow bandwidth (e.g., 4 MHz or 5 MHz) may be used. A transmission range objected by the LP-WURx may correspond to the present 802.11.

Figure 12:
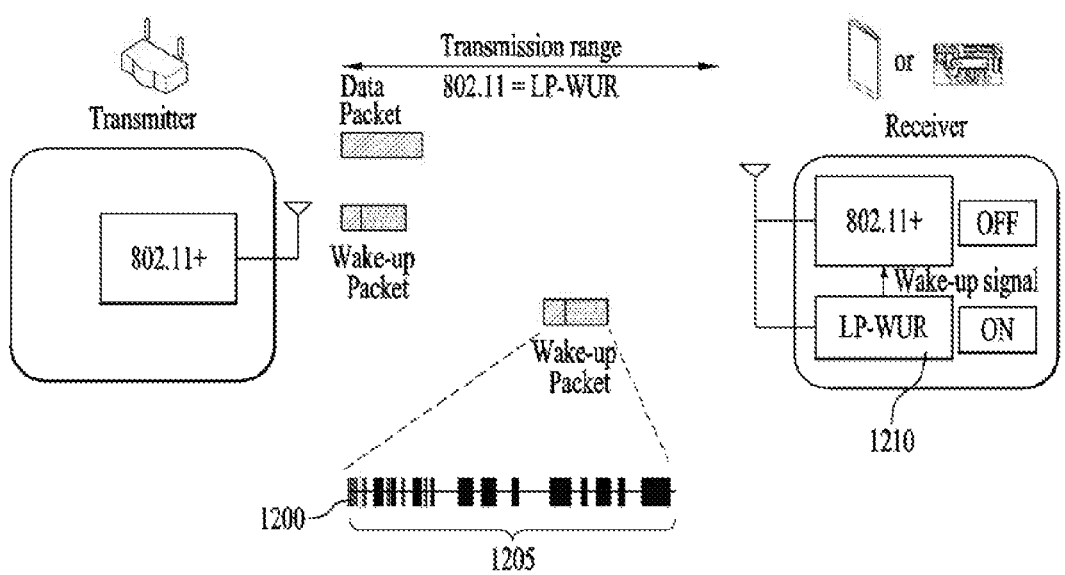
FIG. 12 is a diagram for describing a design and operation of an LP-WUR.

FIG. 12 is a diagram for describing a design and operation of a wake-up radio packet.

Referring to FIG. 12, a wake-up radio packet may include a Primary connectivity radio (e.g., wireless LAN) preamble 1200 and a payload 1205 of a wake-up radio packet.

The Primary connectivity radio preamble 1200 is designed for coexistence with the legacy wireless LAN system, and for packet protection, an L-SIG of wireless LAN may be used for the Primary connectivity radio preamble 1200. Accordingly, $3^{rd}$ party legacy STA may identify that the corresponding wake-up packet is not intended for the STA itself but a medium of the current Primary connectivity radio is occupied by the other STA through the Primary connectivity radio preamble 1200 of the wake-up packet. However, an LP-WURx does not decode the Primary connectivity radio preamble 1200 of the wake-up packet. This is because the LP-WURx that supports a narrow band and OOK demodulation does not support reception of 802.11 signals.

The payload of the wake-up radio packet may be that of demodulated in the on-off keying (OOK) scheme. As an example, the payload of the wake-up radio packet may include at least one of a wake-up preamble MAC header (e.g., a receiver address, etc.), a frame body and a frame check sequence (FCS). Meanwhile, the OOK modulation may be performed by modifying an OFDM transmitter.

The LP-WURx 1210 may consume very little power of 100 µW or less as described above, and implemented by a small and simple OOK demodulator.

As such, since the wake-up radio packet is required to be designed to be compatible in a wireless LAN system, the wake-up radio packet may include a preamble of the legacy wireless LAN (e.g., OFDM scheme) and a new LP-WUR signal wave form (e.g., OOK scheme).

Figure 13:
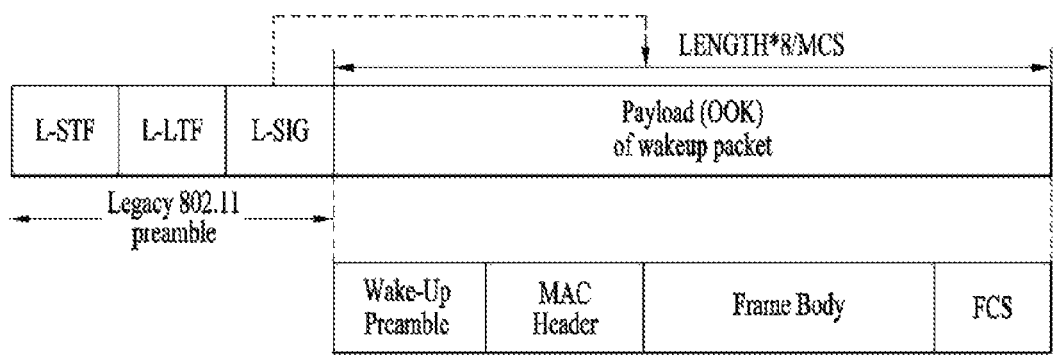
FIG. 13 illustrates an example of a wake-up radio packet.

FIG. 13 illustrates an example of a wake-up radio packet. The wake-up radio packet shown in FIG. 13 includes a legacy wireless LAN preamble for coexistence with a legacy STA.

Referring to FIG. 13, the legacy wireless LAN preamble may include an L-STF, an L-LTF and an L-SIG. The wireless LAN STA (e.g., $3^{rd}$ party) may detect a start of the wake-up radio packet through the L-STF. In addition, the wireless LAN STA (e.g., $3^{rd}$ party) may identify an end of the wake-up radio packet through the L-SIG. For example, the L-SIG field may indicate a length of payload (e.g., OOK modulated) of the wake-up radio packet.

The payload of the wake-up radio packet may include at least one of a wake-up radio preamble, a MAC header, a frame body and an FCS. The wake-up radio preamble may include a PN sequence, for example. The MAC header may include a receiver address. The frame body may include other information required for wake-up. The FCS may include a cyclic redundancy check (CRC).

Figure 14:
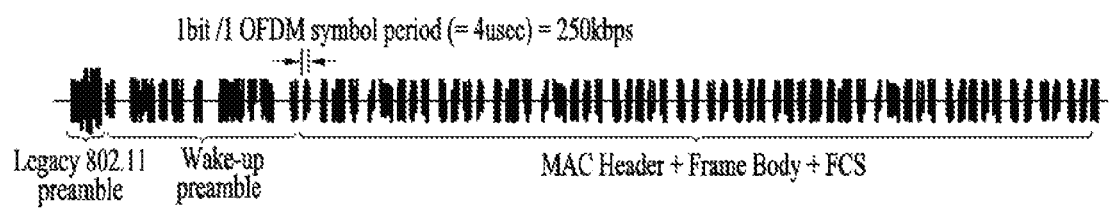
FIG. 14 illustrates a wave form of a wake-up radio packet.

FIG. 14 illustrates a wave form of a wake-up radio packet shown in FIG. 13. Referring to FIG. 14, in the payload of the wake-up radio packet which is OOK modulated, 1 bit per OFDM symbol length (e.g., 4 µsec) may be transmitted. Accordingly, a data rate of the payload of the wake-up radio packet may be 250 kbps.

Figure 15:
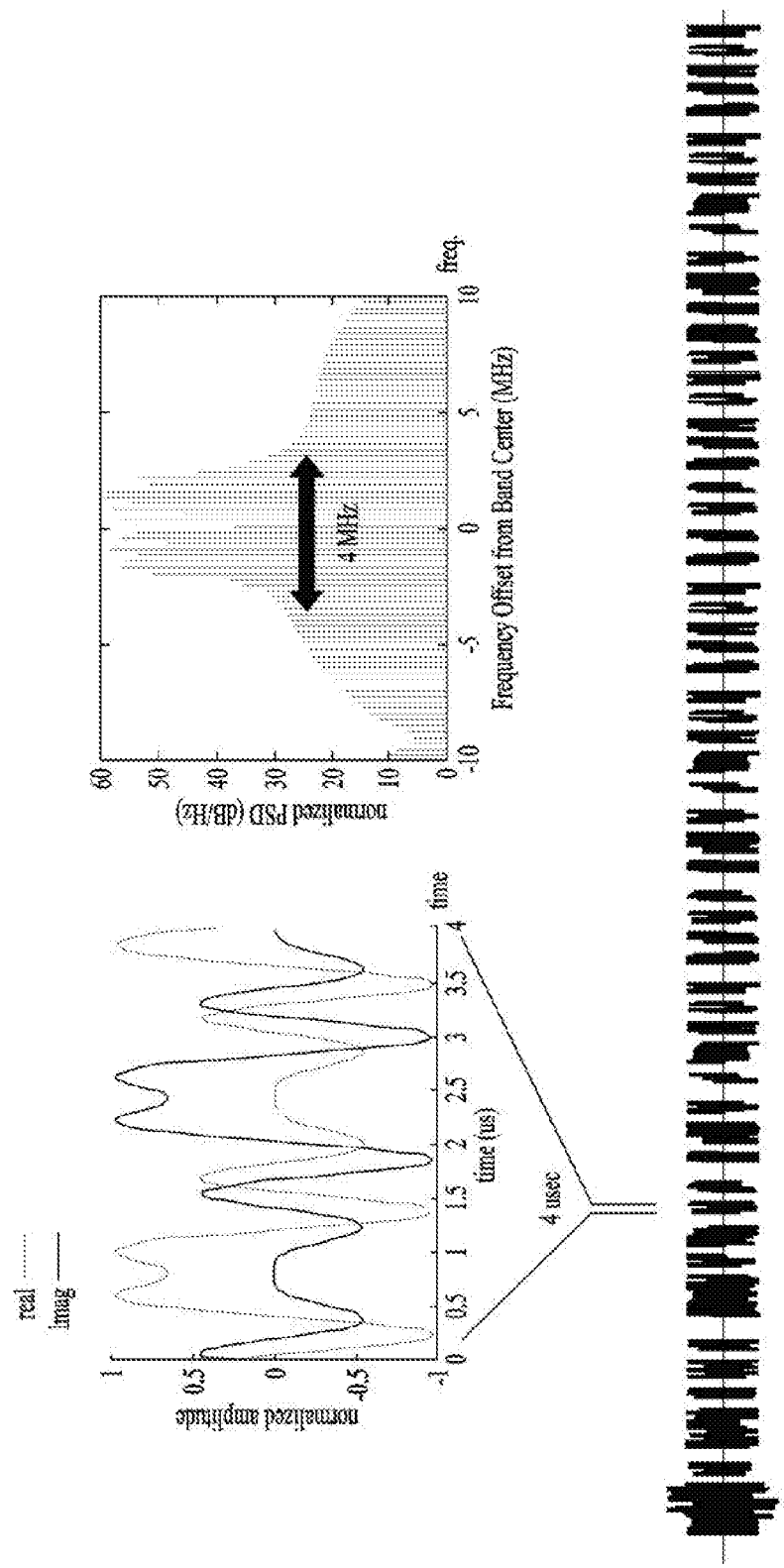
FIG. 15 is a diagram for describing a generation of a wake-up radio packet using an OFDM transmitter of wireless LAN.

FIG. 15 is a diagram for describing a generation of a wake-up radio packet using an OFDM transmitter of wireless LAN. In wireless LAN, phase shift keying (PSK)-OFDM transmission scheme is used, and the generation of a wake-up radio packet by adding a separate OOK modulator for OOK modulation has a disadvantage of increasing implementation cost of a transmitter. Accordingly, it is described a method of generating an OOK modulated wake-up radio packet by reusing the OFDM transmitter.

According to the OOK modulation scheme, bit value 1 is modulated as a symbol having power of a threshold value or more (e.g., on), and bit value 0 is modulated as a symbol having power of a threshold value or less (e.g., off). Of course, it is available to defined bit value 1 as power off, on the contrary.

As such, in the OOK modulation scheme, bit values 1/0 are indicated through on/off of power in the corresponding symbol location. Such a simple OOK modulation/demodulation scheme has an advantage of reducing the power consumed for signal detection/demodulation of a receiver and the cost for implementing it. In addition, the OOK modulation that turns on/off a signal may be performed by reusing the existing OFDM transmitter.

The left graph shown in FIG. 15 illustrates a real part and an imaginary part of a normalized amplitude of power for 1 symbol duration (e.g., 4 μsec) for bit value 1 which is OOK modulated by reusing the existing OFDM transmitter of wireless LAN. Since the OOK modulation result for bit value 0 corresponds to power off, depiction is omitted.

The right graph shown in FIG. 15 illustrates a normalized power spectral density (PSD) on a frequency domain for bit value 1 which is OOK modulated by reusing the existing OFDM transmitter of wireless LAN. For example, 4 MHz in the center of the corresponding band may be used for an LP-WURx. It is assumed that the LP-WURx operates in 4 MHz bandwidth in FIG. 15, but this is just for the convenience of description, and other size of frequency bandwidth may be used. However, it is preferable that the LP-WURx operates in a bandwidth which is smaller than the existing operation bandwidth of wireless LAN.

In FIG. 15, it is assumed that a subcarrier width (e.g., subcarrier spacing) is 312.5 kHz, and a pulse width of an OOK pulse corresponds to 13 subcarriers. 13 subcarriers correspond to about 4 MHz (i.e., 4.06 MHz=13*312.5 kHz) as mentioned above.

In the conventional OFDM transmitter, an input sequence of inverse fast Fourier transform (IFFT) is defined as s={13 subcarrier tone sequence}, and after IFFT of the corresponding sequence s is performed as $X_t$=IFFT(s) and a cyclic prefix (CP) of 0.8 μsec is attached, which becomes a symbol length of about 4 μsec.

A wake-up radio packet may be briefly referred to as a wake up radio (WUR) signal or a WUR packet. The WUR packet may include a packet for broadcast/multicast (e.g., WUR beacon) and a packet for unicast (e.g., a packet for terminating a WUR mode of a specific WUR STA and waking up). The WUR packet may also be referred to as a WUR frame.

Figure 16:
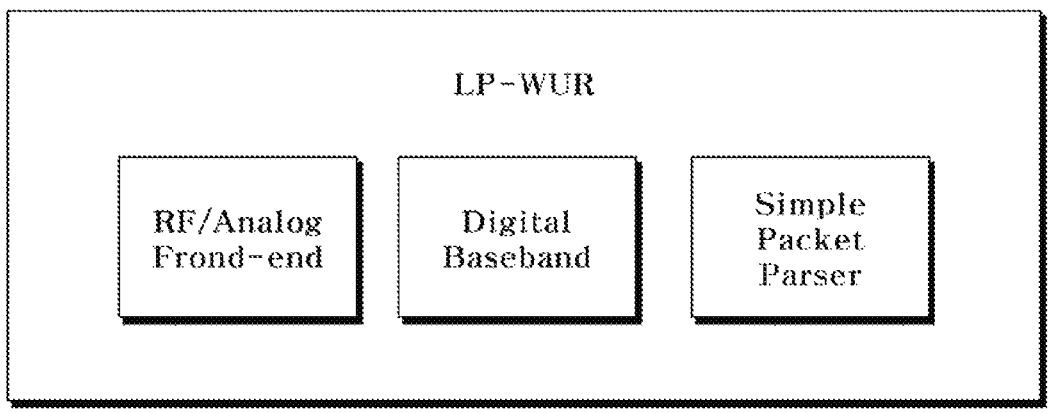
FIG. 16 illustrates a structure of an LP-WUR.

FIG. 16 illustrates a structure of an LP-WURx. Referring to FIG. 16, an LP-WURx may include an RF/analog Front-end, a digital baseband processor and a simple packet parser. FIG. 16 shows an exemplary configuration, and a WUR receiver of the present invention is not limited to the LP-WURx structure shown in FIG. 16.

Hereinafter, a WLAN STA having a WUR receiver is simply referred to as a WUR STA.

WUR ID (Wake Up Radio Identifier)

In the conventional wireless LAN system, an AP allocates a single AID in the range of 1 to 2007 to an STA during an association procedure (e.g., step S530 of FIG. 3). When transmitting a PS-Poll frame, the STA informs that the STA itself wakes up to the AP by including the AID information which is allocated in the Duration/ID field of a MAC header. In addition, the AP may configure TIM by using information of the AID allocated to the STA and transmit the TIM to the STA. When the STA operating in power saving (PS) mode receives the TIM and a bit corresponding to its own AID is set to 1 in a bitmap of the TIM, the STA regards that the AP has data to transmit to the STA itself and transmits the PS-Poll frame.

In order to reduce power consumption, the STA may be switched from the Primary connectivity radio mode (e.g., WLAN mode such as IEEE 802.11 a/b/g/n/ac/ax, etc.) to the WUR mode. For example, the STA may monitor a WUR packet through a WUR receiver in the WUR mode, and turn-off the Primary connectivity radio (e.g., IEEE 802.11 a/b/g/n/ac/ax, etc.). Hereinafter, it is described an ID used by STAs operating in the WUR mode in a low power wireless LAN system (802.11 WUR) and a WUR ID allocation. The WUR ID may be that of at least a part of the existing AIDs or newly defined for the WUR mode.

When transmitting a WUR packet to the STA in the WUR mode, the AP may include a WUR ID (e.g., AID) of the STA which is going to be awake by receiving the WUR packet in the WUR packet. The STA may determine whether the received WUR packet is its own packet based on the WUR ID included in the WUR packet. The STA may terminate the WUR mode in the case that the received WUR packet is its own packet, and may return to the Primary connectivity radio (e.g., WLAN) mode. For example, in the case of returning to the Primary connectivity radio mode, the STA may turn-on the Primary connectivity radio (e.g., WLAN transceiver). As such, the WUR ID included in the WUR packet may be referred to as a receiver address or a receiver ID (RX ID).

Meanwhile, in an actual wireless LAN environment, WUR STAs having the WUR function and non-WUR STAs not having the WUR function may operate by accessing a single AP. In the case that AIDs of the WUR STAs and the non-WUR STAs are allocated in the existing 1-2007 areas arbitrarily or sequentially and Power saving (PS) operation is performed based on the allocated AIDs, in the TIM bitmap for the non-WUR STAs operating in the existing PS mode, the AIDs of the non-WUR STAs and the AIDs of the WUR STAs are mixed. Accordingly, a size of the TIM bitmap (e.g., part virtual Bitmap) transmitted through a beacon frame may be increased inefficiently. In addition, assuming the case that the TIM including information of several STAs is transmitted through the WUR packet, a size of the TIM included in the WUR packet may be increased inefficiently.

Hereinafter, it is described exemplary methods for solving such a problem.

WUR ID Allocation

A WUR transmitter (e.g., an AP), for WUR STAs operating in the WUR mode, may allocate WUR IDs to the WUR STAs through the Primary Connectivity Radio (e.g., WLAN, etc.). The WUR ID is information for identifying the WUR STA when the WUR STA enters the WUR mode.

Figure 17:
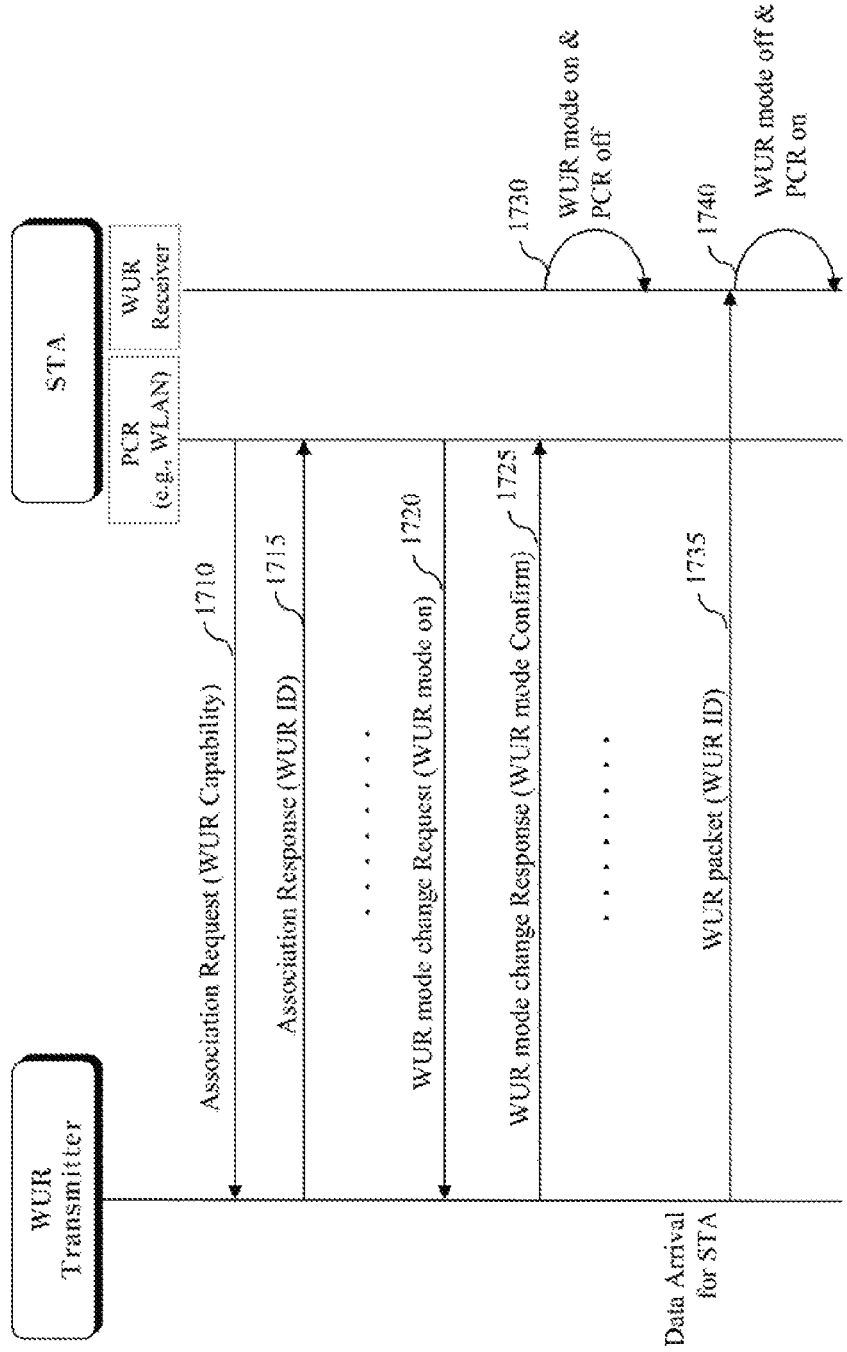
FIG. 17 illustrates an example of allocating a WUR ID according to an embodiment of the present invention.
Figure 18:
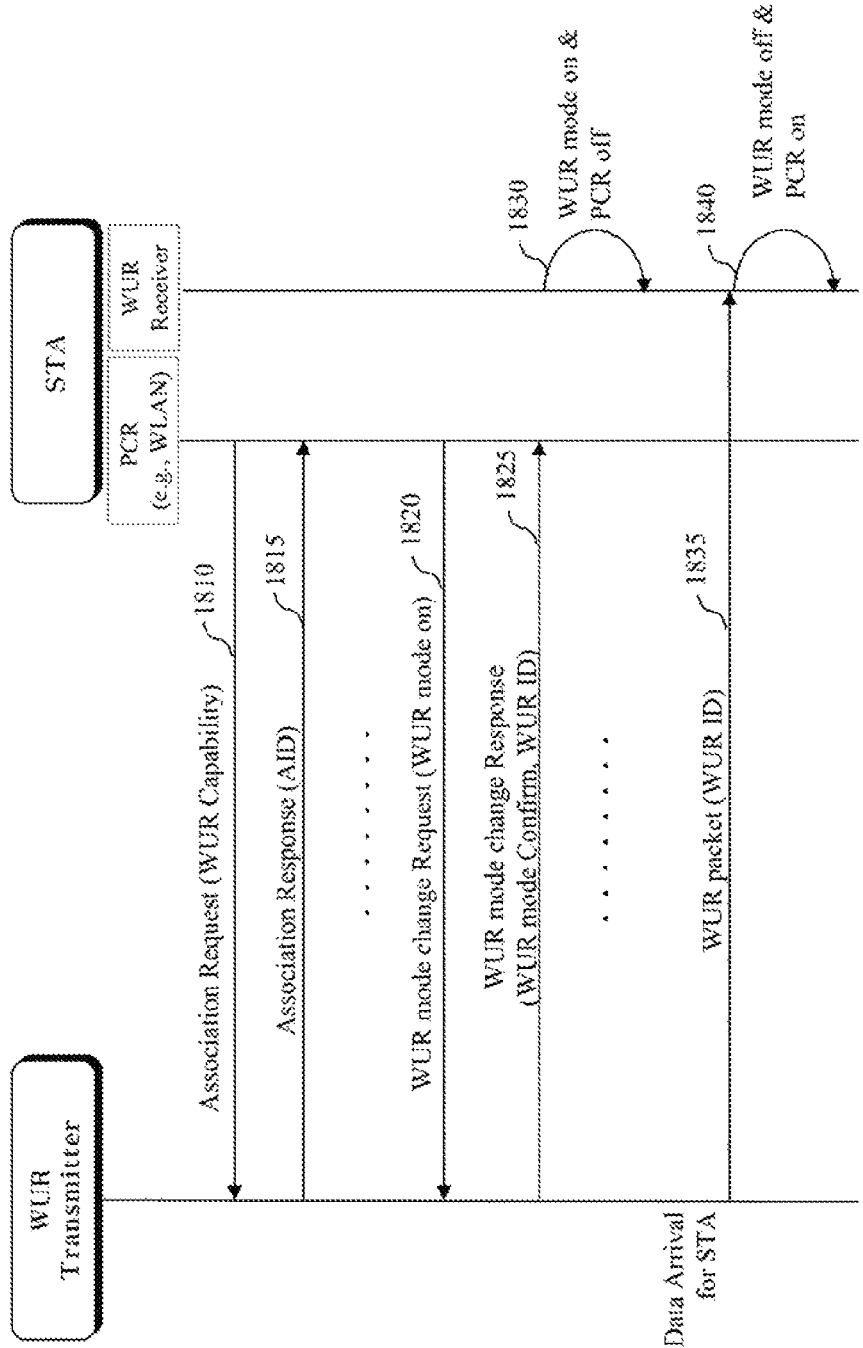
FIG. 18 illustrates an example of allocating a WUR ID according to another embodiment of the present invention.

When a WUR STA having WUR mode capability is associated, an AP may allocate a WUR ID to the WUR STA (e.g., FIG. 17) or before the WUR STA enters the WUR mode after the association, allocate a WUR ID to the WUR STA through a separate procedure (e.g., FIG. 18). The separate procedure may be a WUR ID allocation procedure, a WUR management procedure, a WUR mode parameter negotiation procedure or a WUR mode entering procedure, but not limited thereto.

Referring to FIG. 17, the WUR STA is allocated with a WUR ID from a WUR transmitter (e.g., an AP) during the association procedure (1710 and 1715). When the WUR STA operates in the WUR mode, when data to be transmitted to the WUR STA is generated, the WUR transmitter transmits a WUR packet to the WUR STA (1735). The WUR transmitter may include the WUR ID in the WUR packet or include information indicating the WUR ID. The information indicating the WUR ID may be TIM element constructed based on the WUR IDs or Group ID to which the WUR ID is belonged, but not limited thereto.

When the WUR STA operating in the WUR mode receives a WUR packet, the WUR STA checks whether the received WUR packet includes its own WUR ID. In the case that the WUR packet includes the WUR ID, the WUR STA may terminate the WUR mode and return o the Primary connectivity radio mode (e.g., WLAN mode) (1740). For example, the STA may turn-on the Primary connectivity radio.

Referring to FIG. 18, after the WUR STA performs the association (1810 and 1815), before entering the WUR mode, the WUR STA transmits and receive with the AP, and is allocated with the WUR ID from the AP (1820 and 1825). For example, when the WUR STA transmits a frame for requesting a WUR mode change to the WUR transmitter, the WUR transmitter may transmit a WUR mode change response frame with the WUR ID being included.

In FIG. 18, for the convenience of description, a WUR ID allocation through a WUR mode change request/response frame is illustrated, but the present invention is not limited thereto. For example, a response frame of a WUR receiver for WUR ID allocation may be a management frame or an action frame format like a WUR mode change response, or the existing control frame such as ACK or Block ACK or a new control frame format.

Alternatively, as mentioned above, before the WUR mode entering procedure, through a separate procedure (e.g., WUR negotiation procedure or WUR parameter negotiation procedure), the AP may allocate the WUR ID to the STAs having the WUR mode capability. When the WUR STA receives the WUR packet in the WUR mode, the WUR STA uses a WUR ID which is allocated from the AP in advance, in order to check whether the WUR packet includes its own WUR ID or information indicating WUR ID. In the case that the WUR packet includes the WUR ID, the WUR STA may terminate the WUR mode and return to the WLAN mode (e.g., turn-on WLAN) (1840).

For example, the allocated WUR ID may be included in a receiver address of the WUR packet when the AP transmits the WUR packet in order to wake up the STAs operating in the WUR mode. Alternatively, when the TIM is included in the WUR packet, the AP may configure the bit of the TIM bitmap which is mapped to the WUR ID of the STA intended to wake up to 1.

Figure 19:
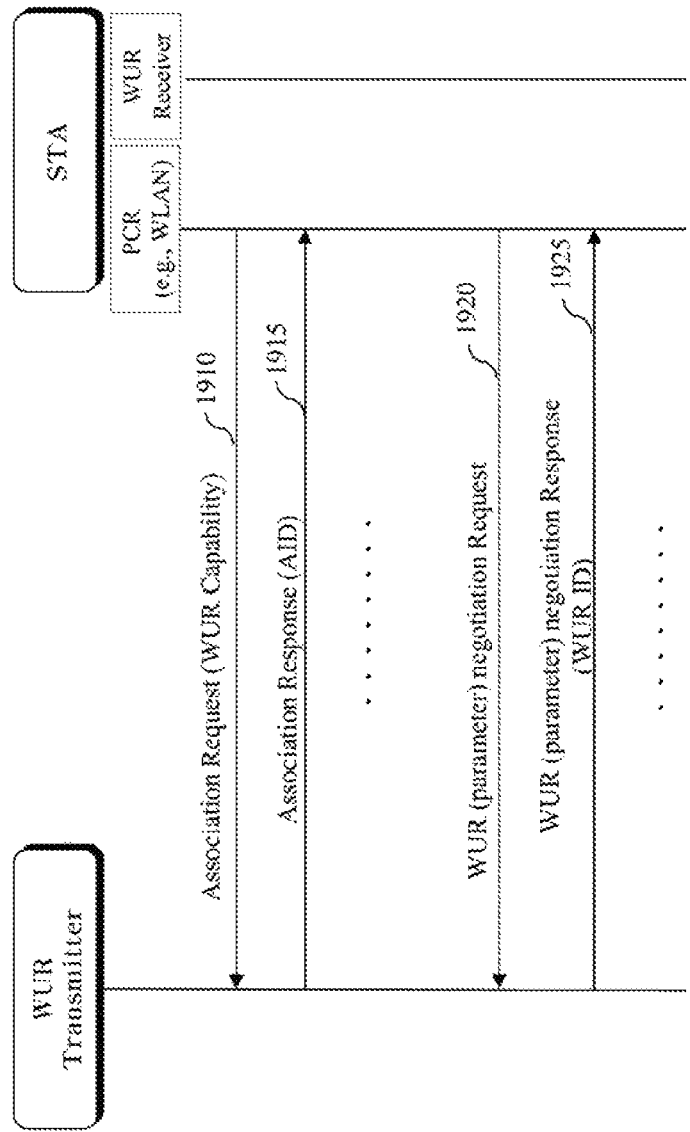
FIG. 19 illustrates still an example of allocating a WUR ID according to still another embodiment of the present invention.

FIG. 19 illustrates a method of allocating a WUR ID through a WUR negotiation procedure according to an embodiment of the present invention. The WUR negotiation procedure shown in FIG. 19 is a procedure of determining a parameter, and the like for a WUR mode operation through a negotiation with an AP, before entering the WUR mode. The title of the WUR negotiation procedure may also be referred to as WUR mode negotiation procedure, WUR parameter negotiation procedure, WUR mode parameter negotiation procedure or the like, but not limited to the title. For the convenience, it is assumed that the WUR transmitter is an AP.

Referring to FIG. 19, an STA transmits an association request frame to an AP through the Primary connectivity radio (e.g., WLAN) (1910), and receives an association response frame from the AP (1910). For example, in order to inform that the STA may operate in the WUR mode, the STA may report that the STA has WUR capability through the association request frame. According to another example, different from FIG. 19, through a procedure separate from the association procedure like a WUR negotiation procedure of the STA, the WUR capability may be reported.

The STA intended to enter the WUR mode transmits a WUR negotiation request frame to the AP before entering the WUR mode (1920). The WUR negotiation request frame may include information for the time consumed for turning-on the Primary connectivity radio (e.g., WLAN) which is turned-off for the WUR mode. Accordingly, the AP may identify a minimum time required from transmitting a WUR packet to the STA in the WUR mode to a state of able to receive the WUR frame by the STA.

The AP transmits a WUR negotiation response frame to the STA in response to the WUR negotiation request frame (1925). The WUR negotiation response frame may include various WUR mode parameters. The WUR negotiation response frame may include the WUR ID (or WUR receiver ID), but not limited thereto, for example, may further include at least one of WUR band/channel information for WUR mode operation and WUR duty cycle information (e.g., Period, On-duration length, Start time of On-duration).

The STA may operate in the WUR mode based on the parameters obtained through the WUR negotiation procedure. For example, the STA may regard the WUR negotiation response frame as a confirmation of the AP for entering the WUR mode, and enter the WUR mode. For another example, after the STA receives the WUR negotiation response frame, the STA may enter the WUR mode by requesting a confirmation to the WUR mode entering or performing a separate procedure for notifying the WUR mode entering with the AP.

Meanwhile, in FIG. 19, it is shown that the STA transmits the WUR negotiation request frame once and the AP transmits the WUR negotiation response frame once, but the present invention is not limited thereto. As another example, it is determined that the WUR parameter received through the WUR negotiation response frame (1925) is not proper for the WUR mode operation of the STA or a modification is required, the STA may perform an additional WUR negotiation procedure with the AP (not shown). For example, the STA may inform the WUR parameter to modify through the WUR renegotiation procedure or configure and transmit a preferred WUR parameter value directly to the AP. Through a response to the WUR renegotiation request of the STA, the AP may allocate a changed WUR parameter to the STA or inform whether to confirm the WUR parameter value that the STA reported. In addition, when the AP changes the WUR parameter value and is intended to inform it to the STA, without receiving the WUR negotiation request frame from the STA, the AP may transmit the changed parameter information with being included in the WUR negotiation response frame (other name may be used). The title of the WUR negotiation request frame or the WUR negotiation response frame may be changed (e.g., WUR mode request frame or WUR mode response frame).

As another example of the present invention, the WUR negotiation request frame 1920 transmitted by the STA may include a WUR ID value selected by the STA, and the AP may inform whether the WUR ID value selected by the STA is available to be used to the STA through the WUR negotiation response frame 1925. For example, the WUR ID value selected by the STA is available to be used, the AP may transmit an indicator informing that the WUR ID value is available to be used through the WUR negotiation response frame, or transmit the WUR ID value itself selected by the STA through the WUR negotiation response frame. In the case that the WUR ID value selected by the STA is unavailable to be used, the AP may transmit an indicator informing that the WUR ID value is unavailable to be used through the WUR negotiation response frame, or allocate different WUR ID value to the STA through the WUR negotiation response frame.

AID Based WUR ID

According to an embodiment of the present invention, an AID may be reused as a WUR ID. For example, in the available whole AID range (e.g., 1 to 2007), a part of the range may be used for a WUR ID.

(i) Option 1: 1 to X AID ranges may be allocated for a WUR STA. X+1 to 2007 AIDs may be allocated for Non-WUR STAs that have no WUR mode capability.

(ii) Option 2: AIDs of X to Y range among 1 to 2007 AID ranges may be allocated for WUR STAs. 1 to X−1 AID ranges and Y+1 to 2007 AID ranges may be allocated for Non-WUR STAs.

(iii) Option 3: X to 2007 AID ranges among 1 to 2007 AID ranges may be allocated for a WUR STA. 1 to X−1 AID ranges may be allocated for Non-WUR STAs.

(iv) Option 4: N AID range sets such as A to B AID ranges, . . . , X to Y AID ranges among 1 to 2007 AID ranges may be allocated for WUR STAs. The remaining AID ranges may be allocated for Non-WUR STAs.

(v) Option 5: A part in non-used AID ranges may be used for a WUR ID. For example, in WLAN, when 2008 to 16383 are reserved, a part (e.g., 2008+X to Y) among 2008 to 16383 may be allocated for a WUR STA. It may be that 0≤X<14375 and, 2008<Y≤16383.

The AID allocated to a WUR STA may be used as an AID in the WUR mode off state, and used as a WUR ID in the WUR mode on state. For example, the AID may be used as the WUR ID without any change, a part of the AIDs may be used as the WUR ID, or the WUR ID may be obtained through hashing of at least a part of the AIDs.

Even in this embodiment, an allocated WUR ID may be used for waking up STAs in the WUR mode. A WUR transmitter may transmit a WUR packet with a WUR ID or information indicating a WUR ID being included to a WUR STA.

Meanwhile, in a WUR system, an STA may operate in the WUR mode after turning off the primary connectivity radio (PCR) (e.g., WLAN), and in the WUR mode, since a frame is transmitted and received through a very simple modulation scheme such as OOK, a transmission speed is low, generally. For example, since a transmission speed (e.g., data rate) is about 250 kbps in the case of using pure OOK modulation scheme, 4 μsec is consumed to transmit information of 1 bit. In the WUR system using low transmission rate, it is preferable to design a size of the WUR packet with a minimum size. Meanwhile, the data rate of the WUR packet is not limited to 250 kbps, but lower data rate (e.g., 62.5 kbps) or higher data rate may be supported. For example, in the case that multiple data rates are supported for WUR packet transmission, information indicating the data rate which is actually used may be included in the WUR packet.

In addition, when an AP transmits a WUR frame/packet to wake up STAs in the WUR mode, the AP may transmit the WUR frame/packet with being included in a transmission address (TA) and a reception address (RA). In the case that a MAC address of 48 bits is used for the reception address, since overhead of the WUR packet is significantly increased, the AP may use the AID which has been used in WLAN as the reception address of the WUR packet so as to indicate an STA to which the corresponding WUR packet is transmitted.

Since an AID has minimum 11 bits in the conventional WLAN, by assuming that a data rate of a WUR system is 250 kbps, 44 μsec is used for AID transmission, and this may be great overhead. In order to reduce overhead, an AP may allocate and use a WUR ID of small size (e.g., 6 bits, 24 μsec) to an STA, but this cause a disadvantage of limiting acceptable number of WUR STAs.

Hereinafter, an address/ID is proposed to solve the signaling overhead problem occurred by using a reception address (e.g., AID or WUR ID) of big size in a low data rate and/or the problem that acceptable number of WUR STAs is limited by using a reception address of small size.

Variable WUR ID Length

According to an embodiment of the present invention, an AP may manage a WUR ID length used in a WUR frame variably. For example, the AP may vary a WUR ID length depending on the number of WUR STAs, and control WUR ID signaling overhead.

Information indicating a length of WUR ID may be included in a WUR frame. A WUR ID of a length indicated by WUR ID length information is included in the WUR frame. The WUR ID length information may be located ahead of the WUR ID in the WUR frame. For example, the WUR ID length information may be included in a MAC header or a WUR preamble of the WUR frame. The WUR STA may know a location and/or a length of a WUR ID to check in the WUR packet by using the WUR ID length information included in the WUR frame. For example, the WUR STA may identify a location in which the WUR ID is ended through the WUR ID length information. The WUR STA decodes an OOK symbol in the range corresponding to from a start to an end of the WUR ID and obtains the WUR ID included in the WUR frame, and compares the obtained WUR ID with the WUR ID that the WUR STA is allocated with in advance. When both sides are identical, the WUR STA determines the corresponding WUR frame to be its own WUR frame.

Figure 20:
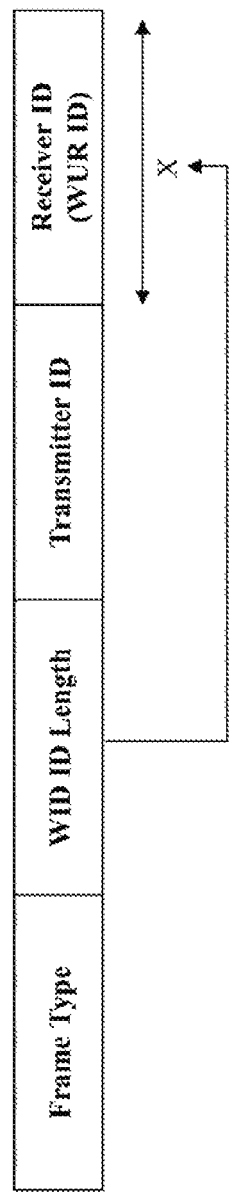
FIG. 20 illustrates an example of indicating a length of a WUR ID included in a WUR packet according to an embodiment of the present invention.

FIG. 20 illustrates an example of a WUR MAC frame. Referring to FIG. 20, a WUR ID length field is included in a MAC header.

Figure 21:
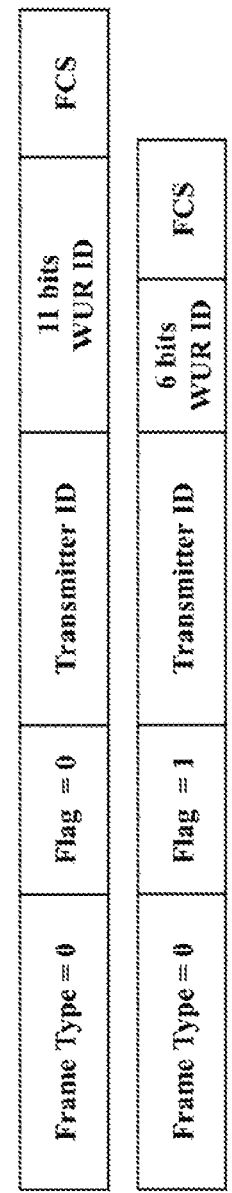
FIG. 21 illustrates an example of indicating a length of a WUR ID included in a WUR packet according to another embodiment of the present invention.

In the case that two WUR ID lengths are supported, a WUR ID length field may correspond to 1 bit flag. For example, referring to FIG. 21, in the case that WUR ID length field/flag=0, the WUR ID may correspond to 6 bits, and in the case that WUR ID length field/flag=1, the WUR ID may correspond to 11 bits.

In the case that four WUR ID lengths are supported, a WUR ID length field may be configured as 2 bits. For example, in the case that WUR ID length field=00, the WUR ID may be to 4 bits, and in the case that WUR ID length field=01, the WUR ID may be 6 bits. In the case that WUR ID length field=10, the WUR ID may be to 8 bits, and in the case that WUR ID length field=11, the WUR ID may be 11 bits.

Alternatively, instead of using explicit WUR ID length information, the WUR ID length may be indicated through a Frame type. For example, the Frame type may indicate a WUR ID length additionally in addition to the use of distinguishing WUR beacon frame and unicast WUR frame.

Figure 22:
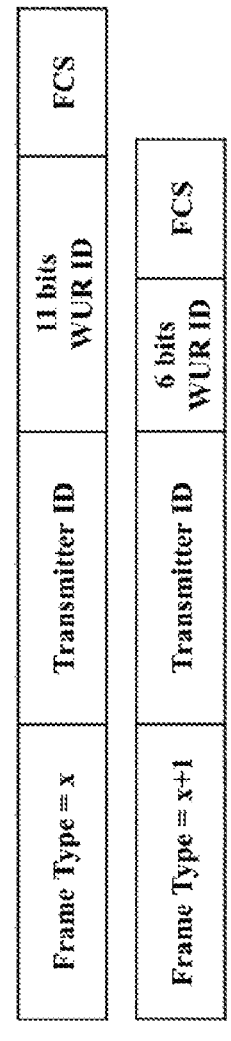
FIG. 22 illustrates an example of indicating a length of a WUR ID included in a WUR packet according to still another embodiment of the present invention.

Referring to FIG. 22, frame type=x may indicate that the corresponding WUR frame is unicast WUR frame having 6 bit WUR ID length, and frame type=y (e.g., x+1) may indicate that the corresponding WUR frame is unicast WUR frame having 11 bit WUR ID length. x may be 0, but not limited thereto.

Figure 23:
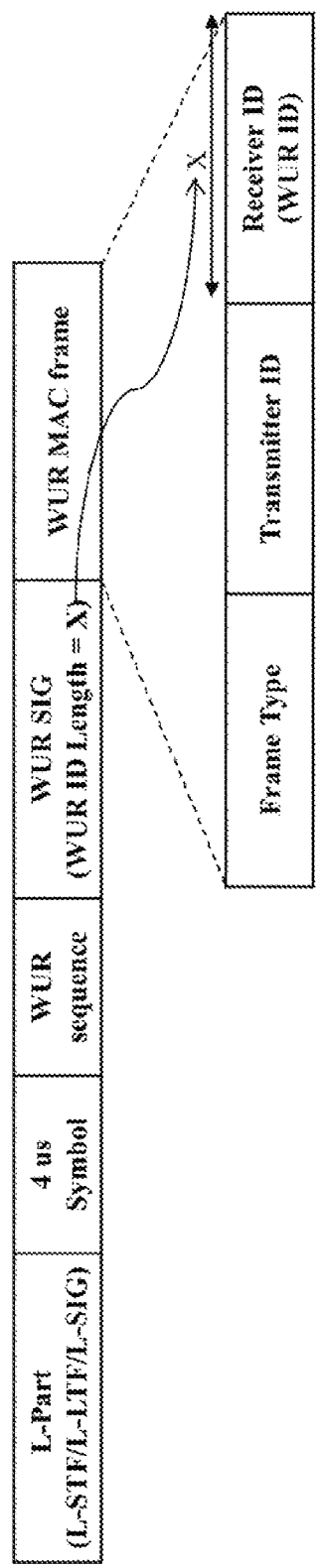
FIG. 23 illustrates an example of indicating a length of a WUR ID included in a WUR packet according to still another embodiment of the present invention.

As another example, as shown in FIG. 23, in front of WUR MAC frame in a WUR packet, a WUR SIG may be located. In this case, 1 bit or 2 bit WUR ID length field described above may be included in the WUR SIG.

As still another example, the WUR ID length information may be indicated through a WUR information sequence instead of the WUR SIG. For example, different sequences may correspond to different WUR ID lengths, respectively. WUR information sequence x may indicate 6 bit WUR ID, and WUR information sequence y may indicate 10 bit WUR ID.

An AP may allocate a WUR ID to an STA through the Primary connectivity radio (e.g., WLAN). The WUR STA compares the WUR ID with an RX ID of the WUR frame in which WUR ID as much as the length indicated through the WUR ID length information. For example, when LSB×bits of its own WUR ID is identical to the RX ID, the WUR STA may determine the corresponding WUR is a frame transmitted to the WUR STA itself.

Combination Between AID and WID

According to an embodiment of the present invention, a WUR ID (hereinafter, WID) allocated to a separate WUR from an AID and an AID may be used in a WUR packet in mixed manner.

For example, an AP may allocate a WID of a small size (e.g., 6 bits) to an STA having WUR mode capability. When transmitting a WUR packet/frame to the STA to which the WID is allocated, the AP may transmit the WID with being included in the RX ID part. When transmitting the WUR packet/frame to the STA to which the WID is not allocated, the AP may transmit the AID with being included in the RX ID part.

Information indicating whether the RX ID of the WUR frame includes the WID or the AID may be included in the WUR frame. For example, WID/AID may be indicated with a similar way to the WUR ID length indication method described above.

Referring to FIG. 24, an explicit indicator (e.g., flag) indicating whether the WUR packet includes the AID or the WID is included in a MAC header. For example, flag 0 may indicates that the AID is included, and flag 1 may indicates that the WID is included.

Alternatively, through a frame type, it may be indicated whether WID/AID is included. For example, different frame types may indicate different Rx ID types, respectively. Referring to FIG. 25, Frame type=0 may indicate a unicast WUR packet including the AID, and Frame type=1 may indicate a unicast WUR packet including the WID.

AID/WID indicator may be signaled through WUR SIG or WUR information sequence, which is similar to the WUR ID length information described above, instead of being including in the MAC header.

Partial AID

According to another embodiment of the present invention, instead of newly allocating a WID to an STA by an AP, a partial AID (PAID) which is a part of the AID may be included in a WUR packet. Here, the PAID included in the WUR packet may be LSB n bits of the AID. The n is an integer between 1 and 11, and multiple n values may be supported for WUR.

Meanwhile, the PAID of the present invention is not limited to the LSB n bits, but may be generated through a mathematical formula using a BSSID and a partial bit of the AID. The PAID may be referred to other name such as Short AID (S-AID), and the like.

For example, when it is assumed that the PAID is 6 bits, information indicating whether 6 bit PAID is included or the AID is included in the WUR packet may be included in the WUR packet. Referring to FIG. 26, flag 0 indicates that the AID is included in the WUR packet as the RX ID. Flag 1 indicates that 6 bit size of PAID is included in the WUR packet as the RX ID.

AID/PAID may be indicated through a frame type instead of a flag. Referring to FIG. 27, frame type 0 indicates that the AID is included in the WUR packet as the RX ID. Frame type 1 indicates that the PAID of 6 bit size is included in the WUR packet as the RX ID.

In the case that different AIDs having the same PAID are allocated to different STAs, an AP may transmit the AID instead of the PAID with being included in the WUR packet. For example, the AP may transmit the WUR packet based on flag 0/frame type 0.

One or more PAID sizes may be supported for the WUR packet. For example, the PAID may be configured as 4 bits, 6 bits, 8 bits or 11 bits (or AID). Referring to FIG. 28, frame type 0 indicates that 11 bits PAID or 11 bits AID is included in the WUR packet, frame type 1 indicates that 8 bits PAID is included in the WUR packet, frame type 2 indicates that 6 bits PAID is included in the WUR packet, and frame type 3 indicates that 4 bits PAID is included in the WUR packet.

In the embodiments described above, instead of the frame type, it may be indicated whether PAID length information and/or PAID/AID is included through other explicit field (e.g., flag).

As such, in the case that the PAID based on LSB n bits of the AID is used, there is an advantage that an AP is not required to allocate a new ID (e.g., WID) except the AID to an STA.

As described above, length information of WUR ID/Rx Identifier such as AID, PAID, WID, and the like may be included in the WUR packet, the length information of the WUR ID may be provided to an STA before a transmission of the WUR packet in advance. For example, in the case that a WUR ID length is not changed frequently, an AP may not transmit WUR ID length information whenever the AP transmit the WUR packet, but transmit the WUR ID length information only when the WUR ID length is changed.

Figure 29:
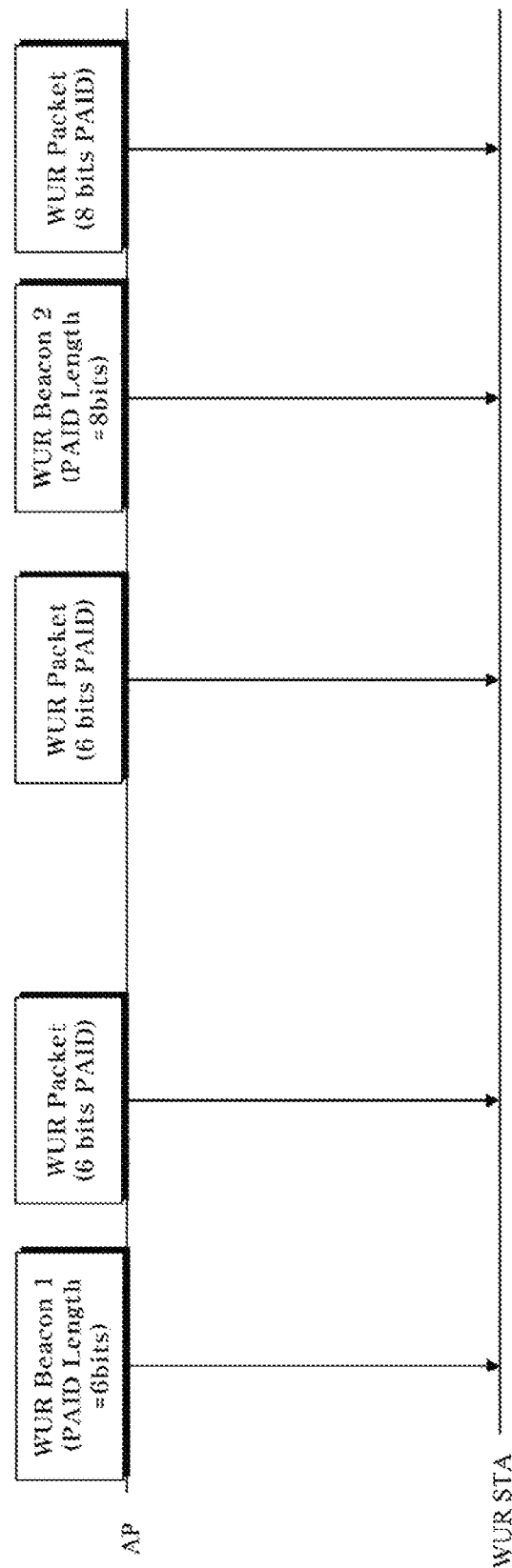
FIG. 29 illustrates an example of transmitting WUR ID length information through WUR beacon frame.

FIG. 29 illustrates an example of transmitting WUR ID length information through WUR beacon frame. For the convenience of description, it is assumed that a WUR ID is a PAID. WUR beacon frame 1 indicates that the PAID length is 6 bits. In the WUR packet transmitted after the WUR beacon frame 1, a PAID of 6 bits is included. When the PAID length is changed to 8 bits through WUR beacon frame 2, in the WUR packet transmitted after the WUR beacon frame 2, a PAID of 8 bits is included.

When the STA operating in the WUR mode receives the WUR packet, the STA identifies the WUR ID included in the WUR packet based on the WUR ID (e.g., PAID, AID, or WID) length information included in the WUR Beacon, and checks whether the WUR ID is identical to its own WUR ID.

As another example, in the WLAN Beacon transmitted in WLAN, WUR ID (e.g., PAID, AID, or WID) length information may be included. Alternatively, before the WUR STA enters initial WUR mode, the WUR STA may obtain the WUR ID length information from an AP through WUR negotiation procedure. During operating in the WUR mode, in the case that an update of the WUR ID length is required, the AP transmits a broadcast WUR packet, and all WUR STAs receive the WLAN Beacon. For example, the WUR STA that receives the broadcast WUR packet may receive the WLAN Beacon after waking up from the WUR mode, and obtain the changed WUR ID length. Immediately after the STA obtains the changed WUR ID length, the STA may return to the WUR mode.

Figure 30:
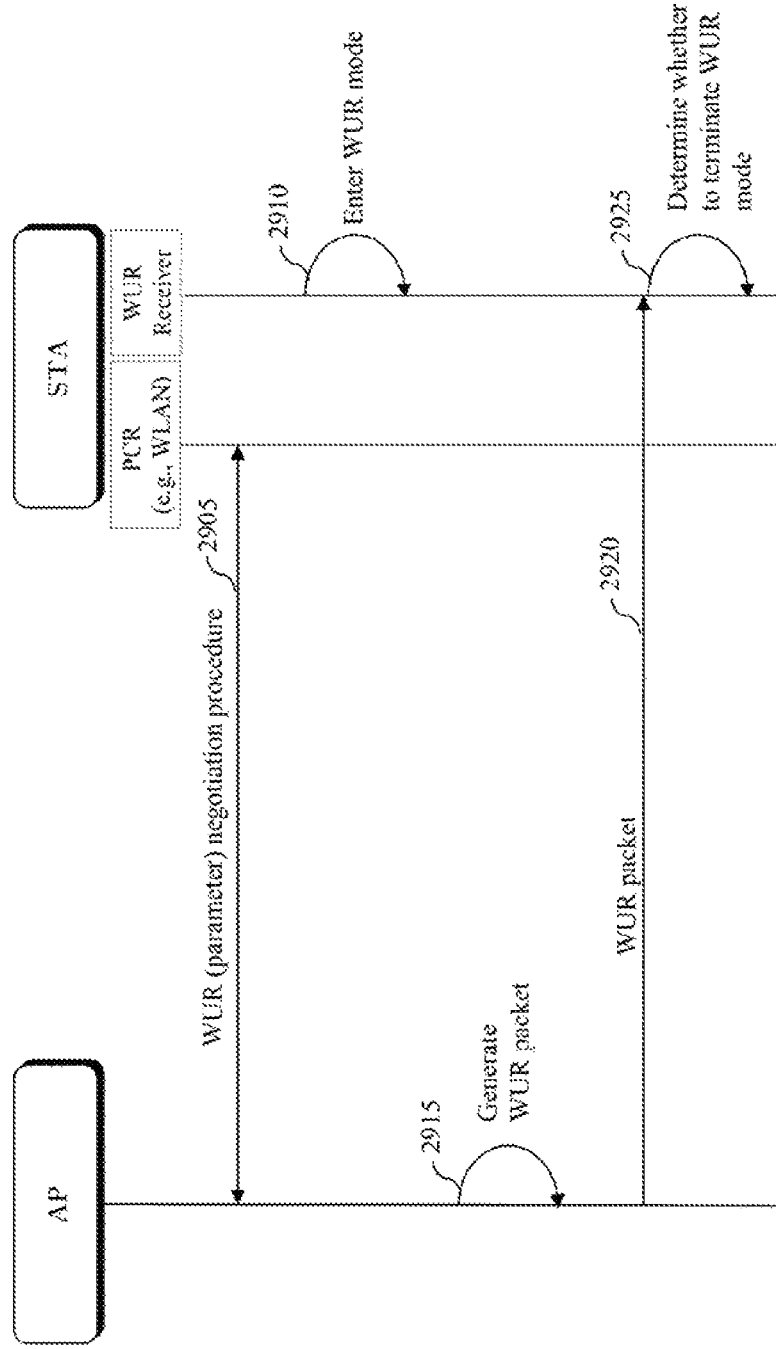
FIG. 30 illustrates an example of a method for transmitting and receiving a WUR packet according to an embodiment of the present invention.

FIG. 30 illustrates an example of a method for transmitting and receiving a WUR packet according to an embodiment of the present invention. The description overlapped with the description above may be omitted.

Referring to FIG. 30, an STA performs a WUR (parameter) negotiation procedure (2905). For example, the STA performs the WUR negotiation procedure through the Primary connectivity radio (e.g., WLAN) and may be allocated with a WUR parameter including a WUR ID, and the like from an AP. The STA progresses the WUR negotiation procedure through the Primary connectivity radio before entering the WUR mode, and is allocated with a WUR ID from the Access Point (AP). However, the procedure of being allocated with the WUR parameter such as the WUR ID and the like is not limited to the WUR negotiation procedure. For example, the WUR parameter such as the WUR ID and the like may be allocated through an association response frame from the AP or a response frame of the AP in response to the WUR mode change request of the STA.

The STA enters the WUR mode (2910). For example, the STA may turn off the Primary connectivity radio (e.g., WLAN transceiver), and may be switched to the WUR mode by turning on the WUR receiver.

The AP generates the WUR packet (2915), and transmits the WUR packet to the STA in the WUR mode (2920).

The STA determines whether to terminate the WUR mode depending on whether the receiver address included in the WUR packet corresponds to the WUR ID of the STA (2925). When the WUR mode is terminated, the Primary connectivity radio (e.g., WLAN transceiver) may be turned on. For example, the STA may terminate the WUR mode in the case that the receiver address included in the WUR packet corresponds to a part designated in the WUR ID of the STA.

A length of the receiver address of the WUR packet may be varied according to a determination of the AP. The STA may receive the information indicating the length of the receiver address which is varied through the WUR packet or the WUR Beacon which is periodically broadcasted. For example, the information indicating the length of the receiver address which is varied may be received through a frame type field included in a MAC header of the WUR packet.

The receiver address of the WUR packet may be configured with at least one format of an association ID (AID) of the STA, a partial AID (PAID) corresponding to least significant bit (LSB) n-bit or a wake-up radio identifier allocated separately from the AID. The WUR packet may further include information indicating a format of the receiver address.

Figure 31:
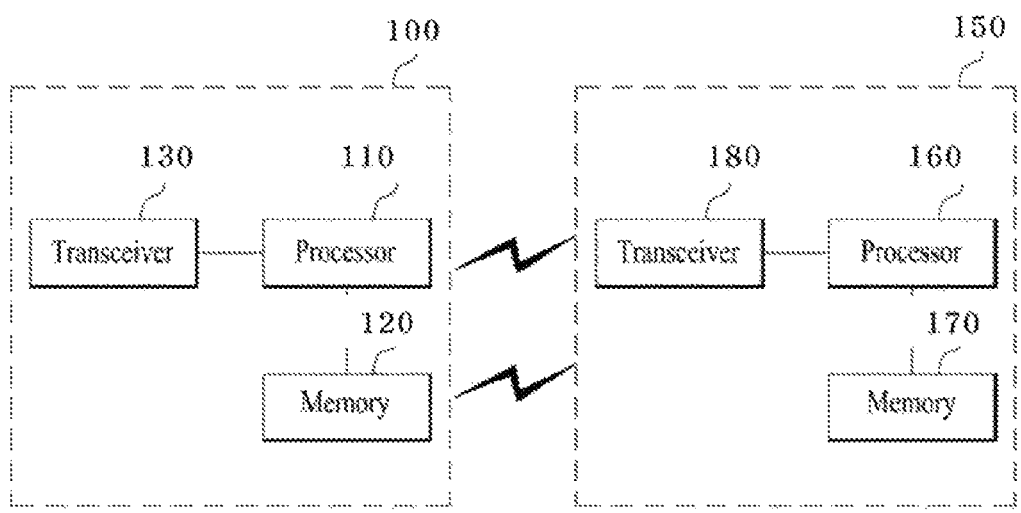
FIG. 31 is a diagram for describing an apparatus according to an embodiment of the present invention.

FIG. 31 is a diagram for describing an apparatus for implementing the method described above.

A wireless device 800 and a wireless device 850 in FIG. 31 may correspond to the aforementioned specific STA and AP, respectively.

The STA 800 may include a processor 810, a memory 820, and a transceiver 830 and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, storage medium, and/or a storage unit. When an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The transceiver 830 of the STA may include a transmitter (not shown) and a receiver (not shown). The receiver of the STA may include a Primary connectivity radio (e.g., WLAN) receiver for receiving a Primary connectivity radio (e.g., WLAN such as IEEE 802.11 a/b/g/n/ac/ax) signal and a WUR receiver for receiving a WUR signal. The transmitter of the STA may include a Primary connectivity radio transmitter for transmitting a Primary connectivity radio signal.

The transceiver 880 of the AP may include a transmitter (not shown) and a receiver (not shown). The transmitter of the AP may correspond to an OFDM transmitter. The AP may transmit a WUR payload in the OOK scheme by reusing the OFDM transmitter. For example, as described above, the AP may OOK demodulate the WUR payload through the OFDM transmitter.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The present invention can be applied to various wireless communication systems including IEEE 802.11 standard.

What is claimed is:

1. A method for a wireless Local Area Network (WLAN), the method comprising:
   transmitting, by a Wake-Up Radio (WUR) station (STA) including a Primary Connectivity Radio (PCR) receiver receiving a WLAN packet and a WUR receiver receiving a WUR packet, an association request including WUR capability information of the WUR STA to an access point (AP), wherein the WUR packet is modulated based on On-Off Keying (OOK) scheme;
   in response to the association request, receiving, by the WUR STA, an association response including an association identifier (AID) from the AP;
   transmitting, by the WUR STA to the AP, a mode request to enter a WUR mode including a time duration in which the WUR STA receives the WUR packet;

in response to the mode request, receiving, by the WUR STA to the AP, a mode response to enter the WUR mode, wherein the mode response includes a WUR ID which identifies an intended receiver of the WUR packet;

receiving a wake-up packet including an ID field from the AP; and determining a power state of the PCR based on the wake-up packet, wherein the power state of the PCR includes a PCR on state and a PCT off state.

2. The method of claim 1, wherein the WUR STA operates based on a PCR on state when the ID field contains the WUR ID.

3. The method of claim 1, wherein the mode response is a Medium Access Control (MAC) frame decodable by the PCR receiver.

4. A Wake-Up Radio (WUR) station (STA) in a wireless Local Area Network (WLAN), the WUR STA comprising:

a Primary Connectivity Radio (PCR) receiver receiving a WLAN packet;

a WUR receiver receiving a WUR packet; and a processor coupled to the PCR receiver and the WUR receiver and configured to:

transmit an association request including WUR capability information of the WUR STA to an access point (AP), wherein the WUR packet is modulated based on On-Off Keying (OOK) scheme;

in response to the association request, receive an association response including an association identifier (AID) from the AP;

transmit a mode request to enter a WUR mode including a time duration in which the WUR STA receives the WUR packet;

in response to the mode request, receive a mode response to enter the WUR mode, wherein the mode response includes a WUR ID which identifies an intended receiver of the WUR packet;

receive a wake-up packet including an ID field from the AP; and determine a power state of the PCR based on the wake-up packet, wherein the power state of the PCR includes a PCR on state and a PCT off state.

5. The WUR STA of claim 4, wherein the WUR STA operates based on a PCR on state when the ID field contains the WUR ID.

6. The WUR STA of claim 4, wherein the mode response is a Medium Access Control (MAC) frame decodable by the PCR receiver.

* * * * *